United States Patent
Bars

(10) Patent No.: US 9,957,747 B2
(45) Date of Patent: May 1, 2018

(54) METHOD FOR OPERATING AN ELECTROMOTIVE ADJUSTING DEVICE

(71) Applicant: Brose Fahrzeugteile GmbH & Co. Kommanditgesellschaft, Bamberg, Bamberg (DE)

(72) Inventor: Sebastian Bars, Bamberg (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 0 days. days.

(21) Appl. No.: 15/629,244

(22) Filed: Jun. 21, 2017

(65) Prior Publication Data
US 2017/0362877 A1  Dec. 21, 2017

(30) Foreign Application Priority Data
Jun. 21, 2016 (DE) .......... 10 2016 211 067

(51) Int. Cl.
| | |
|---|---|
| *H02P 23/00* | (2016.01) |
| *H02P 25/00* | (2006.01) |
| *H02P 27/00* | (2006.01) |
| *E05F 15/689* | (2015.01) |
| *H02P 7/29* | (2016.01) |

(52) U.S. Cl.
CPC .......... *E05F 15/689* (2015.01); *H02P 7/2913* (2013.01)

(58) Field of Classification Search
CPC ............................. E05F 15/689; H02P 7/2913
USPC .......................................... 318/799
See application file for complete search history.

(56) References Cited

U.S. PATENT DOCUMENTS

| | | | | |
|---|---|---|---|---|
| 5,208,483 | A * | 5/1993 | Reneau | B60J 7/0573 180/271 |
| 5,982,124 | A * | 11/1999 | Wang | G05B 13/024 318/286 |
| 6,823,629 | B2 * | 11/2004 | Mersch | B60J 1/17 49/349 |
| 2014/0109999 | A1 * | 4/2014 | Meissner | F16D 25/14 137/565.11 |

* cited by examiner

*Primary Examiner* — Erick Glass
(74) *Attorney, Agent, or Firm* — Muncy, Geissler, Olds & Lowe, P.C.

(57) ABSTRACT

A method for operating an electromotive adjusting device of a motor vehicle, in particular a window opener. The electric motor is hereby regulated to a setpoint rotational speed, the setpoint rotational speed being set as a function of an external parameter.

8 Claims, 2 Drawing Sheets

METHOD FOR OPERATING AN ELECTROMOTIVE ADJUSTING DEVICE

This nonprovisional application claims priority under 35 U.S.C. § 119(a) to German Patent Application No. 10 2016 211 067.5, which was filed in Germany on Jun. 21, 2016, and which is herein incorporated by reference.

BACKGROUND OF THE INVENTION

Field of the Invention

The invention relates to a method for operating an electromotive adjusting device of a motor vehicle. The invention further relates to an electromotive adjusting device of a motor vehicle and to the use of an electromotive adjusting device of a motor vehicle. The electromotive adjusting device is in particular an electric window opener.

Description of the Background Art

Motor vehicles usually comprise adjusting parts, for example side windows and/or a sliding roof, which can be opened or closed by means of an electromotive adjusting drive of an electromotive adjusting device. The respective adjusting part is actuated by means of a transmission driven by an electric motor in the form of, in particular, a spindle or a worm gear. To adjust the displacement speed of the adjusting part, the electric motor is operated by means of pulse width modulation (PWM), and thus the electrical energy supplied is adjusted. In order to configure the required control device as cost-effectively as possible, it comprises a bridge circuit, by means of which the adjustment direction of the adjusting part is adjusted. In this case, an electrical output of the electric motor can be guided either to ground or to a further electrical potential of the electrical system, usually 12 volts, by means of a relay of the bridge circuit. The other electrical output of the electric motor is electrically connected to the PWM control, which in turn is also guided either to the potential of the electrical system or to ground via a further relay of the bridge circuit. Consequently, depending on the control of the relays, the direction of a current flow through the electric motor can be adjusted, the average electric voltage being adjusted by means of the PMW control.

In order to provide a user of the electric window opener with an appealing acoustic impression, the electric motor is to be operated with an essentially always same rotational speed during an adjusting movement, at least over a comparatively large section of the adjustment path. As a result, acoustic sound waves with a certain frequency spectrum are generated by the electric motor, the frequency spectrum being substantially constant. In this case, interfering frequencies are attenuated, for example, by means of attenuation elements. In order to achieve the constant rotational speed, a speed control is used, at which the setpoint rotational speed is predetermined and which is varied, for example, as a function of the position of the adjusting part along the adjustment path. The setpoint rotational speed is compared with an actual rotational speed, which is determined in particular by means of Hall sensors of the electric motor. In order to reduce a deviation between the two rotational speeds, the energization of the electric motor is changed by means of the PWM control. In other words, the electrical energy is used as the manipulated variable.

So that the adjusting part can be moved against a static friction and also in the case of possible unfavorable cases, for example, contamination or icing of guide rails of the adjusting part, an electric motor with a comparatively large torque is used. However, it has been found that if the electric motor is operated at a speed above a certain rotational speed, this results in a comparatively poor acoustic impression on a user since the human ear perceives high frequencies comparatively strongly and these frequencies are perceived as unpleasant. Therefore, generally speaking, the electric motor is operated at reduced power, and the maximum power is used only for applying a high torque, which is only called up in rare cases and usually only at the beginning of the adjusting movement.

SUMMARY OF THE INVENTION

It is therefore an object of the invention to provide a method for operating an electromotive adjusting device of a motor vehicle as well as an electromotive adjusting device as well as a use of an electromotive adjusting device, wherein in particular an acoustic impression is improved for a user and preferably am adjustment time of an adjusting part is shortened.

The method serves for the operation of an electromotive adjusting device, which can be part of a motor vehicle. The electromotive adjusting device has an adjusting part which is moved along an adjustment path by means of the electric motor. The adjusting part is, for example, a door, such as a sliding door or tailgate, or a window pane, such as a side window. The electromotive adjusting device is thus a window opener which is electrically operated, in particular an (electric) window opener. Alternatively, the adjusting part is a sliding roof or a seat, but at least a component of a seat, such as a backrest or a seating surface.

The method provides for the electric motor to be regulated to a setpoint rotational speed. For this purpose, an energization of the electric motor, in particular by means of a PWM control, is adapted. In particular, the supplied electric current or the electric voltage is regulated. The setpoint rotational speed is set as a function of an external parameter. In this case, the external parameter is detached from states of the electromotive adjusting device and in particular from a position of an adjusting part of the adjusting device, which is an internal parameter of the electromotive adjusting device. In other words, the external parameter is a parameter which cannot be influenced by the electromotive adjusting device, at least not directly. For example, the setpoint rotational speed is varied between two limit values, the sign of the setpoint rotational speeds being in particular identical. In other words, the electric motor is operated in the same direction by means of the setpoint rotational speed, the amount of the setpoint rotational speed being adjusted as a function of the external parameter. Preferably, the setpoint rotational speed is always greater than 10%, 15%, 20%, 25% or 50% of the maximum rotational speed of the electric motor. Suitably, the setpoint rotational speed is less than or equal to 100%, 90% or 80% of the maximum rotational speed. In particular, 100% of the maximum rotational speed of the electric motor is used as the setpoint rotational speed when a specific external parameter is present.

Since the setpoint rotational speed is adjusted as a function of the external parameter, ambient conditions of the electromotive adjusting device can be taken into account so that, depending on the external parameter, the adjusting part can be moved comparatively quickly or the electric motor can be operated at a setpoint rotational speed which is convenient for the user. The ambient conditions can only be influenced to a comparatively small extent by means of the electromotive adjusting device, which is why these requirements cannot be met if only internal parameters are taken into account.

Suitably, the setpoint rotational speed is set continuously or at least continuously set in sections as a function of the external parameter. In other words, the setpoint rotational speed changes when the external parameter changes. In particular, the setpoint rotational speed is adjusted linearly between two values, the two values being assigned to specific external parameters. In an alternative to this, the setpoint rotational speed is adjusted in stages, with only two stages being present, for example. In this case, a specific setpoint rotational speed is used when the external parameter is below a threshold value and the other setpoint rotational speed is used if the external parameter is above the threshold value. For example, a combination results in which a step-by-step adaptation takes place in a section of the value range of the external parameter.

A volume level can be used as an external parameter. In other words, the external parameter indicates the presence of acoustic signals and their strength. For example, an absolute loudness is used as an external parameter, that is, independent of at which frequency a specific sound level is present. In an alternative to this, a specific sound level is selected at a certain frequency, and this sound level is used as the volume level. As a result, subjective impressions of the user or conditions of the human ear and a human perception of sound can be taken into account. For example, at a certain volume level, which is detected at a specific frequency, a specific setpoint rotational speed is set, whereas a different setpoint rotational speed is used at a different volume level.

A first setpoint rotational speed can be selected at a first volume level and a second desired speed is selected at a second volume level. In this case, the first volume level is greater than the second volume level, and the first setpoint rotational speed is greater than the second setpoint rotational speed. In other words, a greater setpoint rotational speed is used for a higher volume level. As a result, the adjusting part is adjusted more quickly, provided that the volume level is increased. In particular, the absolute loudness is used, i.e. the volume level of the complete signal spectrum. In an alternative to this, only the volume level in the range of a frequency is used as an external parameter, which corresponds to the setpoint rotational speed. For example, the respective frequency, that is to say of the rotational speed and of the volume level, are the same or differ from one another by a maximum of a certain amount, for example 5 hertz and/or 2%, 3%, 5%. In summary, it is detected whether the user could even perceive the electric motor due to ambient noise. In this case, the electric motor is operated at a setpoint rotational speed so that the user cannot perceive the electric motor or only to a comparatively small extent.

If a comparatively high volume level is present, the electric motor can also be operated with a comparatively high setpoint rotational speed, which leads to comparatively high noise development at comparatively high frequencies. However, these cannot be detected by the user because of the increased volume level. As a result, the acoustic impression is not changed, and the adjustment speed of the adjusting part is increased, that is, the adjustment time of the adjusting part is shortened. However, if the volume level is low, a pleasant acoustic impression is provided to the user by the appropriate selection of the setpoint rotational speed. For example, in the case of comparatively low wind noise, and/or if no devices are operated which have an increased volume level, for example a radio, the second setpoint rotational speed is selected. However, if the radio is operated, in particular at a comparatively high volume level, or if comparatively high wind noise occurs, the first setpoint rotational speed is selected. Here the diminished acoustics are not perceived by the user. However, the shortened adjustment time is perceived by the user, which leaves a pleasant impression on the latter. In particular, the setpoint rotational speed is adjusted proportionally to the volume level.

For example, the second setpoint rotational speed may be between 10% and 15%, between 20% and 40% and in particular equal to 30%+/−5% of the maximum setpoint rotational speed of the electric motor. The first setpoint rotational speed may be, for example, between 50% and 100%, between 70% and 95% or between 80% and 90% of the maximum rotational speed of the electric motor. For example, the second volume level may be between 50 dB and 0 dB, in particular between 40 dB and 10 dB and suitably 20 to 30 dB. The first volume level is in particular greater than 50 dB, for example greater than or equal to 60 dB, 70 dB, 80 dB or 90 dB.

For example, the volume level is detected in an interior of the motor vehicle. This is suitably done by means of a microphone and/or the volume level is determined by means of a setting, in particular a setting value of a volume controller, of an audio playback device, such as, for example, the radio. Due to the detection of the volume level in an interior of the motor vehicle, the external parameter is recorded where the user is usually located, for whom the improved acoustic impression is intended.

In an embodiment, a vehicle speed can be used as an external parameter. In other words, the setpoint rotational speed is set as a function of the vehicle speed. Suitably, the setpoint rotational speed is determined by means of a function, wherein the vehicle speed and the volume level are used as parameters. In particular, based on the vehicle speed, a first auxiliary setpoint rotational speed and a second auxiliary setpoint rotational speed are determined based on the volume level. The lesser of the two auxiliary setpoint rotational speeds is suitably used as the setpoint rotational speed. The vehicle speed corresponds in particular to the volume level. For example, a volume level is usually increased at an increased vehicle speed due to wind noise, engine noise or tire rolling resistance. As a consequence, if a volume level cannot be detected, it can be approximated by means of the vehicle speed. In this case, a possible setting of an audio playback device of the motor vehicle is preferably also taken into account. From these two values, therefore, the volume level can be deduced. As an alternative to this, a specific setpoint rotational speed is always used for a specific vehicle speed.

The setpoint rotational speed can be lowered if the vehicle speed is lower than a first limit value. The first limit value is, for example, between 20 km/h and 80 km/h or between 25 km/h and 70 km/h and, for example, between 30 km/h and 50 km/h. In particular, the first limit value is 30 km/h, 40 km/h or 50 km/h. For example, the second setpoint rotational speed is used if the vehicle speed is lower than the first limit value, and otherwise the first setpoint rotational speed is used. Suitably, the first setpoint rotational speed is used at a first vehicle speed and the second setpoint rotational speed is used at a second vehicle speed, if these are employed. In this case, the first vehicle speed is greater than the second vehicle speed. In other words, the first vehicle speed is greater than the first limit value and the second vehicle speed is lower than the first limit value.

The setpoint rotational speed can be proportionally adjusted to the vehicle speed, and, for example, there is a linear relationship between the setpoint rotational speed and the vehicle speed. Consequently, when the motor vehicle is at a standstill, the adjusting part is displaced comparatively slowly, while the adjustment time is shortened at an increased vehicle speed. In the case of increased vehicle speed, on account of the wind, driving, rolling and/or engine noise, the diminished acoustics of the electric motor are not noticeable due to the increased setpoint rotational speed, so that the user can only perceive the shortened adjustment time. Irrespective of the volume level, the adjustment time is also shortened even at elevated vehicle speeds, for example when driving on a highway, so that, if the electromotive adjusting device is a window opener, pressure fluctuations occurring for the user due to the open window and the increased driving speed only occur for a comparatively short period of time, provided that the user wants to close the window pane. In addition to the improved acoustic impression, this also leads to improved user comfort.

An electrical supply voltage, i.e., the electrical supply voltage that is applied to the electric motor during operation, can be used as the external parameter. In particular, the electrical supply voltage and the vehicle speed are used as external parameters. Alternatively, the electrical supply voltage and the volume level are used as external parameters. The electrical supply voltage and the vehicle speed as well as the volume level are particularly preferred as external parameters. In this case, the setpoint rotational speed is preferably determined by means of a function of which the parameters are the electrical supply voltage, the vehicle speed and the volume level.

The setpoint rotational speed can be lowered if the electrical supply voltage is less than a second limit value. The second limit value is, for example, 8 volts, 9 volts, 10 volts, 11 volts or 12 volts, provided that a potential electrical system of the motor vehicle carries 12 volts. Alternatively, the second limit value is, for example, 45 volts, 46 volts, 47 volts or 48 volts, provided the electrical system of the motor vehicle carries 48 volts. In particular, the second limit value is between 80% and 95% or between 85% and 90% of the nominal voltage, which the electrical system normally has. In this case, for example, the second setpoint rotational speed is used if the electrical supply voltage is lower than the second limit value.

The setpoint rotational speed can be reduced to 50%, 60%, 70% or 80% of the setpoint rotational speed, which is used when the electrical supply voltage is greater than or equal to the second limit value. If the setpoint rotational speed is still set by means of the volume level or the vehicle speed, the setpoint rotational speed is, in particular, further reduced as long as the electrical supply voltage is less than the second limit value. For example, a proportional adjustment of the setpoint rotational speed as a function of the electrical supply voltage takes place. Alternatively, a step-by-step adjustment of the setpoint rotational speed as a function of the electrical supply voltage takes place, with in particular only two stages being present.

Accordingly, if the electric supply voltage is low, the electric motor is operated at a reduced setpoint rotational speed, and electric energy is thus removed from the electrical system to a lesser extent. Consequently, if there is a decline in the electrical supply voltage, said electrical system is only slightly loaded due to the electrical adjusting device. It is also ensured in this case that the deviation of the realized rotational speed of the electric motor from the setpoint rotational speed deviates only by small amounts because of the comparatively small energy draw, wherein the deviation can be in both positive and negative directions.

As a result, a possible modulation of the sound waves emitted by means of the electromotive adjusting device or an acoustic hovering due to the decline in the electrical supply voltage are avoided, which further improves the acoustic impression.

For example, the external parameter is determined by means of the electrical supply device. Particularly preferably, however, the external parameter is provided by means of a bus system. The bus system is, in particular, a CAN or LIN bus system. As a result, no further sensors of the electrical adjusting device are required for detection of the external parameter, and production costs of the electromotive adjusting device are therefore reduced. The external parameter is usually already present within the motor vehicle or can be detected by means of existing motor vehicle sensors. In particular, the vehicle speed is known within the motor vehicle and does not have to be detected additionally by means of sensors of the electromotive adjusting device. Rather, a value for the vehicle speed fed into the bus system is used as an external parameter.

The electromotive adjusting device of a motor vehicle has the electric motor, which is, for example, a brushed commutator motor or a brushless DC motor (BLDC). Furthermore, the electromotive adjusting device comprises an adjusting part, which is moved during operation along an adjustment path. The adjusting part is driven by means of the electric motor. In particular, the electromotive adjusting device is an electric window opener or an electric seat adjustment, in which the adjusting part is the seat or parts of the seat, such as the backrest thereof. The electromotive adjusting device is operated according to a method in which the electric motor is regulated to a setpoint rotational speed, the setpoint rotational speed being set as a function of an external parameter. The electromotive adjusting device is suitable, preferably provided and arranged, for carrying out the method. Preferably, the electromotive adjusting device has a control unit, by means of which the method is carried out. The control unit comprises, for example, a microchip. The external parameter is, in particular, a volume level, a vehicle speed and/or an electrical supply voltage.

The electromotive adjusting device can have a speed control. In particular, a current and/or voltage control is subordinate to the speed control, by means of which current is supplied to the electric motor during operation. Suitably, the electromotive adjusting device has an interface for a bus system, in particular a plug. In this case, the interface is preferably suitable for a CAN or LIN bus system.

Suitably, the electric motor has a Hall sensor. By means of this, a movement of a rotor of the electric motor is expediently detected. Suitably, the electric motor has two Hall sensors, which are advantageously offset by 90° with respect to one another relative to the rotational axis of the electric motor. In this way, on the one hand, a rotational direction of the electric motor and, on the other hand, an actual rotational speed of the electric motor can be determined, wherein, for example, the actual rotational speed is determined by means of Hall pulses which are calculated by means of Hall signals which are, for example, sinusoidal and cosinusoidal. In particular, the Hall pulses, i.e., a binary signal, are thus generated on the basis of the Hall signals of the Hall sensors, each Hall pulse suitably corresponding to a quarter turn of the electric motor.

The electromotive adjusting device of a motor vehicle can be used to carry out a method in which the electric motor is regulated to a setpoint rotational speed, wherein the setpoint rotational speed is set as a function of an external parameter. As an electric motor, the electromotive adjusting device comprises, for example, a brushed commutator motor or a brushless DC motor. The adjusting device suitably has an adjusting part and/or a control unit, within which means for carrying out the method are preferably provided and/or present. The electromotive adjusting device is preferably an (electromotive) window opener.

Accordingly, the embodiments and advantages made with regard to the method are also to be transferred to the electromotive adjusting device and its use, and vice versa.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
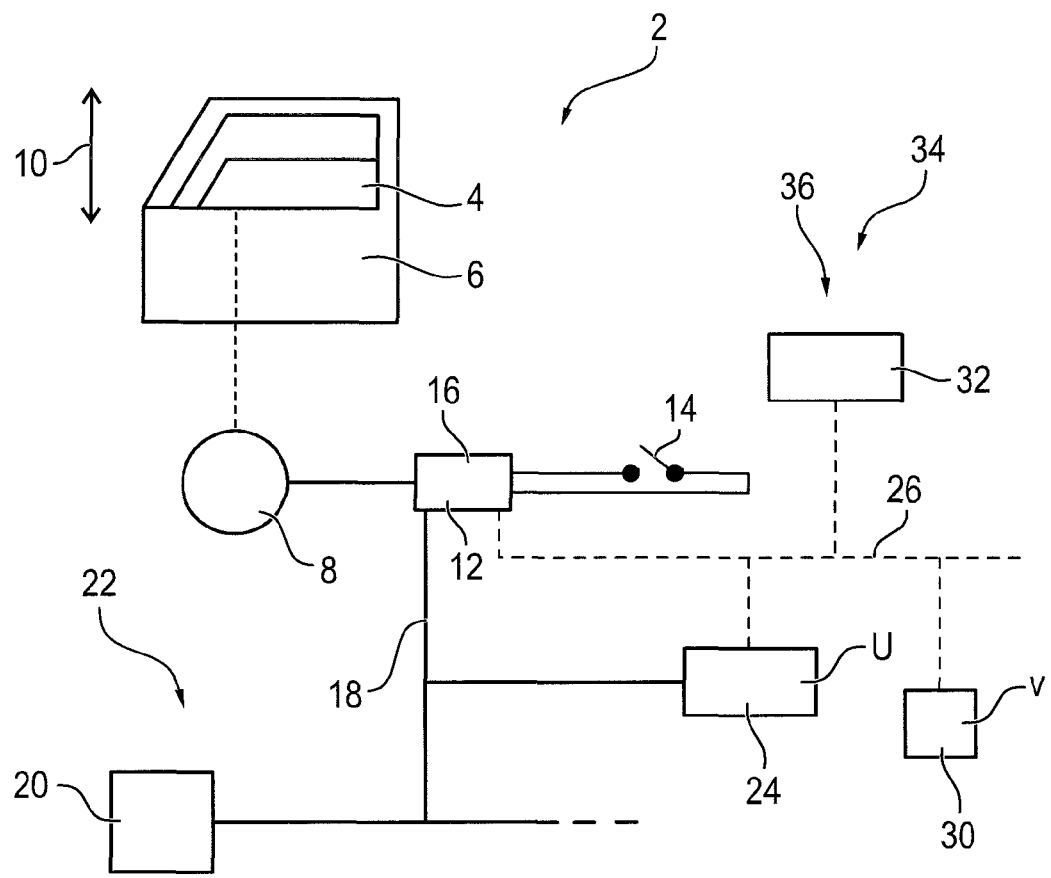
FIG. 1 illustrates a schematically simplified, an electromotive window opener.

FIG. 1 schematically shows an electric window opener 2 with a window pane 4, which is integrated in a door 6 of a motor vehicle. The window pane 4 is moved along an adjustment path 10 by means of an electric motor 8. For this purpose, a worm wheel of a worm gear (not shown) of the electric window opener 2 is operatively connected with a worm associated with the electric motor 8 on the shaft side, the rotational movement of the electric motor 8 being converted into a translational movement of the window pane 4 by means of the worm wheel and by means of a cable drum or a spindle.

The electric motor 8 is controlled by means of a control unit 12, which is activated via a button 14 by a user of the motor vehicle. Within the control unit 12 there is a speed control 16 for the electric motor 8. In this case, by means of variation of the pulse/pause ratio, the electrical energy supplied to the electric motor 8 is controlled/regulated. The control unit 12 also has an algorithm for detection in the event of jamming, wherein, for example, the force applied by the electric motor 8 and/or the position of the window pane 4 along the adjustment path 10 are used as input variables. For example, when a certain threshold value of the force applied by the electric motor 8 is exceeded, a jamming event is detected.

The control unit 12 is supplied with electrical energy via a power supply cable 18 by a battery 20 of an onboard power supply 22. During normal operation, the onboard power supply 22 carries an electrical supply voltage U of 12V. The battery 20 is fed by an electrical generator, not shown. The actual electrical supply voltage U is monitored by means of a voltage sensor 24. The measured value is fed into a CAN bus system 26, to which the control unit 12 is also connected via a signal path. An onboard computer 30 is also connected to the CAN bus system 26, with which a vehicle speed v of the motor vehicle is detected/processed. The onboard computer 30 controls, for example, an internal combustion engine and/or a braking system of the motor vehicle. The motor vehicle further comprises a microphone 32, which is arranged in an interior space 34 of the motor vehicle, in which the button 14 is also located. By means of the microphone, a volume level 36 can be detected in the interior space 34. The microphone 32 is also connected to the CAN bus system 26. The control unit 12, the microphone 32, the voltage sensor 24 and the onboard computer 30 exchange data via the CAN bus system 26.

Figure 2:
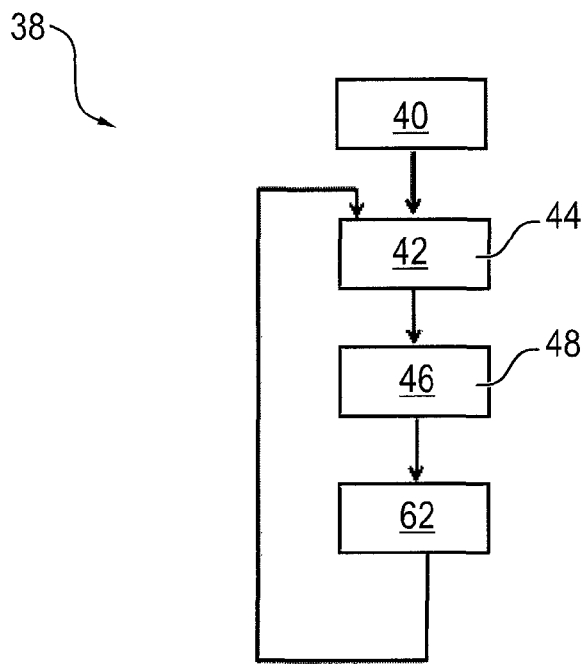
FIG. 2 illustrates a method for operating the electromotive window opener.

FIG. 2 shows a method 38 for operating the electric window opener 2. In a first operating step 40, the actuation of the button 14 is detected by the user. In a subsequent second operating step 42, an external parameter 44 is detected. The external parameter 44 is the volume level 36 in the interior space 34, which is detected by means of the microphone 32 and is provided via the CAN bus system 26. Furthermore, the vehicle speed v, which is provided by the onboard computer 30 via the CAN bus system 26, is used as the external parameter 44. The electrical supply voltage U, which is detected by means of the voltage sensor 24 and is also provided via the CAN bus system 26, is also used as the external parameter 44. In a subsequent third operating step 46, a setpoint rotational speed 48 is set as a function of the external parameters 44.

Figure 3:
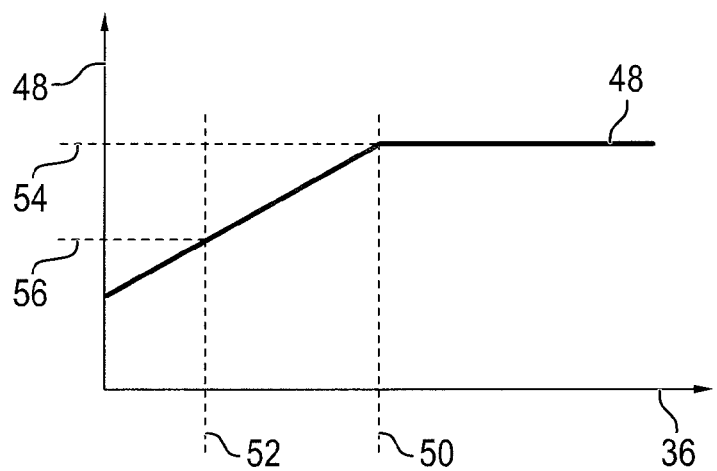
FIG. 3 illustrates a dependency of a setpoint rotational speed on a volume level.

FIG. 3 schematically shows the dependency of the setpoint rotational speed 48 on the volume level 36. At a first volume level 50, which is greater than a second volume level 52, a first setpoint rotational speed 54 is selected. At the second volume level 52, a second setpoint rotational speed 56 is selected, which is less than the first setpoint rotational speed. The first setpoint rotational speed 54 corresponds to 90% of the maximum rotational speed of the electric motor 8, and the second setpoint rotational speed 56 corresponds to half the maximum rotational speed of the electric motor 8. The first volume level 50 is equal to 70 dB and the second volume level 52 is equal to 40 dB. Between the first and the second volume level 50, 52, the setpoint rotational speed 48 is continuously linearly increased. If the volume level 36 is greater than the first volume level 50, the first setpoint rotational speed 54 is used. Instead of directly measuring the volume level 36 in the interior space 34 by means of the microphone 32, the volume level 36 is determined in an alternative by means of a setting of a radio. In this exemplary embodiment, instead of the microphone 32, the radio is connected to the CAN bus system 26 via a signal path.

Figure 4:
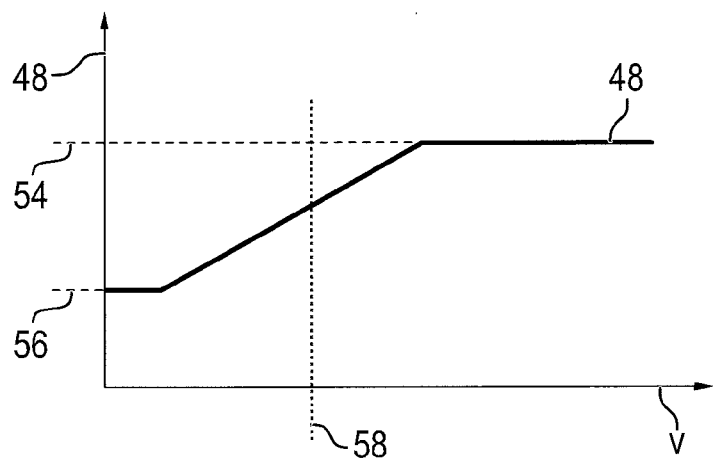
FIG. 4 illustrates a dependency of the setpoint rotational speed on a vehicle speed.

FIG. 4 shows the dependency of the setpoint rotational speed 48 on the vehicle speed v. If the vehicle speed v is less than a first limit value 58, which is 50 km/h, the setpoint rotational speed 48 is decreased. A continuous, linear lowering of the setpoint rotational speed 48 takes place, whereby, for example, at a vehicle speed v, starting from 100 km/h, the first setpoint rotational speed 54 is always used, and at a vehicle speed v less than 10 km/h until a stationary state, the second setpoint rotational speed 56 is used. Between 10 km/h and 100 km/h, for example, a linear adaptation of the setpoint rotational speed 48 occurs as a function of the vehicle speed v.

Figure 5:
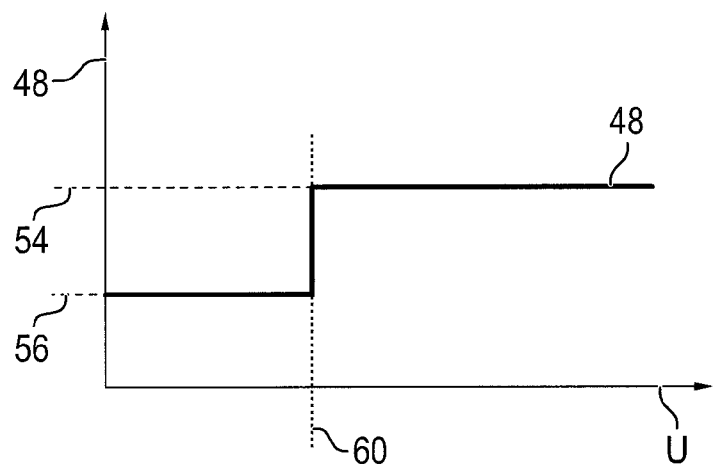
FIG. 5 illustrates a dependency of the setpoint rotational speed on an electrical supply voltage.

FIG. 5 shows the dependency of the desired rotational speed 48 on the electrical supply voltage U. If the electrical supply voltage U is less than a second limit value 60, which is 11 V, the second setpoint rotational speed 56 and otherwise the first setpoint rotational speed 54 are used. The setpoint rotational speed 48 is determined as a function of both the volume level 36, the vehicle speed v and the electrical supply voltage U. In particular, the setpoint rotational speed 48 is first determined in each case as a function of in each case one of the external parameters 44, and the minimum is determined therefrom. This minimum is used as the setpoint rotational speed 48.

In the fourth operating step 62, which follows, the electric motor 8 is regulated to the setpoint rotational speed 48, wherein by means of the speed control 16, a pulse width modulation of an electric current or an electric voltage occurs, by means of which the electric motor 8 is acted upon. In other words, the electric current or the electric voltage is used as the manipulated variable of the speed control 16. The electric current is monitored by means of a subordinate control circuit. The actual rotational speed of the electric motor 8 is detected by means of Hall sensors (not shown) and this value is compared to the setpoint rotational speed 48. As a function of the deviation, the energization is adapted by means of the speed control 16. The external parameter 44 or the external parameters 44 continue to be detected on an ongoing basis and, as a function thereof, the setpoint rotational speed 48, to which the electric motor 8 is regulated, is set. In other words, the second, third and fourth operating steps 43, 46, 62 are executed as long as the user actuates the button 14 or until the window pane 4 has completely traversed the adjustment path 10.

On the basis of the method 38, the setpoint rotational speed 48 is adjusted in such a way when the motor vehicle is at a standstill, and if no loud consumer is active, i.e., when a radio is switched off, that a comparatively good acoustical performance is achieved. If, however, the volume level 36 in the interior space 34 is significantly increased, for example at a comparatively high vehicle speed v or, if loud music prevails in the interior space 32, then the setpoint rotational speed 48 is increased, which considerably reduces the adjustment time. In other words, the window pane 4 is moved along the complete adjustment path 10 in a shortened time. The poorer acoustics caused thereby are not perceived by the user since the volume level 36 is already increased. Consequently, a good acoustical performance of the electric window opener 2 is given when the driving noise of the electric motor is perceptible by the user. Furthermore, a comparatively high adjustment speed of the window pane 4 along the adjustment path 10 is possible when the volume level 36 is already increased due to other components of the motor vehicle 2, that is to say, when a comparatively loud background noise is present.

The invention is not limited to the embodiment described above. Rather, other variants of the invention can also be derived from those skilled in the art without departing from the scope of the invention. In particular, all the individual features described in connection with the exemplary embodiment can also be combined with each other in another way without departing from the subject matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating an electromotive adjusting device of a motor vehicle, in particular a window opener, the method comprising:
    regulating an electric motor of the electromotive adjusting device to a setpoint rotational speed; and
    setting the setpoint rotational speed as a function of an external parameter,
    wherein a volume level is used as the external parameter, the volume level excluding sound caused by the electromotive adjusting device during operation of the electromotive adjusting device.

2. The method according to claim 1, wherein a first setpoint rotational speed is selected at a first volume level and a second setpoint rotational speed is selected at a second volume level, the first volume level being greater than the second volume level and the first setpoint rotational speed being greater than the second setpoint rotational speed.

3. The method according to claim 1, wherein the volume level is detected in an interior space of the motor vehicle.

4. The method according to claim 1, wherein the external parameter is provided via a bus system.

5. An electromotive adjusting device of a motor vehicle, in particular a window opener, comprising a speed controller and which is operated in accordance with the method according to claim 1.

6. A method for operating an electromotive adjusting device of a motor vehicle, in particular a window opener, the method comprising:
    regulating an electric motor of the electromotive adjusting device to a setpoint rotational speed; and
    setting the setpoint rotational speed as a function of an external parameter,
    wherein the external parameter is a vehicle speed.

7. The method according to claim 6, wherein the setpoint rotational speed is lowered if the vehicle speed is less than a first limit value.

8. The method according to claim 6, wherein a first setpoint rotational speed is selected at a first vehicle speed and a second setpoint rotational speed is selected at a second vehicle speed, the first vehicle speed being greater than the second vehicle speed and the first setpoint rotational speed being greater than the second setpoint rotational speed.

* * * * *